(12) United States Patent
Gibson et al.

(10) Patent No.: US 6,775,249 B1
(45) Date of Patent: Aug. 10, 2004

(54) CONNECTION HANDLING IN COMMUNICATIONS NETWORKS

(75) Inventors: David Lynton Gibson, Suffolk (GB); John Cyril David Tooze, Colchester (GB)

(73) Assignee: Britsh Telecommunications public limited company, London (GB)

(*) Notice: Subject to any disclaimer, the term of this patent is extended or adjusted under 35 U.S.C. 154(b) by 0 days.

(21) Appl. No.: 09/582,056
(22) PCT Filed: Jan. 20, 1999
(86) PCT No.: PCT/GB99/00184
§ 371 (c)(1),
(2), (4) Date: Jun. 21, 2000
(87) PCT Pub. No.: WO99/37080
PCT Pub. Date: Jul. 22, 1999

(30) Foreign Application Priority Data

Jan. 20, 1998 (GB) .............................................. 9801207

(51) Int. Cl.⁷ ........................... H04L 5/16; H04L 12/28; H04J 3/12; H04J 3/16
(52) U.S. Cl. ....................... 370/296; 370/390; 370/467; 370/522; 358/400; 709/318
(58) Field of Search .............................. 370/392, 393, 370/352, 401, 466, 522, 524, 390, 230, 389, 296, 467; 379/142.01, 211.01, 211.02, 207.14, 210.01, 219; 709/318, 201, 203; 358/400, 440

(56) References Cited

U.S. PATENT DOCUMENTS 6,339,591 B1 * 1/2002 Migimatsu .................. 370/352
6,498,797 B1 * 12/2002 Anerousis et al. .......... 370/522

* cited by examiner

Primary Examiner—Duc Ho
(74) Attorney, Agent, or Firm—Nixon & Vanderhye P.C.

(57) ABSTRACT

An apparatus transmits information, by a communications network, to any one of a plurality of communication terminals connected to the network in response to a failed communications attempt by any one of the terminals. The apparatus comprises: an identification facility for identifying a network address of a terminal making a failed communications attempt, at least one data storage for storing a plurality of network addresses so identified, and an information transmission facility for transmitting information to a terminal making the failed communications attempt. The information transmission facility is adapted to access the data storage facility, to locate a network address stored therein and to transmit the information to a network address so located.

30 Claims, 8 Drawing Sheets

International or Inter-network Switching Centre

CONNECTION HANDLING IN COMMUNICATIONS NETWORKS

TECHNICAL FIELD

The present invention relates to connection handling in communications networks and finds particular application in handling incorrect destination codes, such as misdialled telecommunications numbers.

BACKGROUND

A result of de-regulation of the telecommunications industry is that many network providers and regulatory bodies have altered the dialling code regimes of their networks to increase capacity and allow for increases in traffic volumes.

These changes in dialling code regimes have been accompanied by increases in the level of misdialled calls. In particular, the level of misdialled facsimile calls has tended to increase disproportionately compared to the level of misdialled voice calls.

This is because the error messages transmitted to fax terminals are usually the same audible error messages that are transmitted to voice terminals. For several reasons, these audible error messages are much less effective, in practice, when transmitted to facsimile terminals than when transmitted to voice terminals. For instance, the user of a facsimile terminal often has the speaker volume turned right down or will have moved away from the terminal.

When changes to dialling code regimes have been complex, it has been known to manually transmit fax messages from international exchanges to customers making misdialled fax calls. However, this manual system is resource intensive and accordingly does not provide an effective long-term solution.

It is also known to locate a fax based responder at local exchanges to advise users of the network that the fax terminal they are attempting to reach has changed numbers. These responders are triggered by incoming calls and, in accordance with the protocol for fax transmission, the responder must establish a new connection with the terminal that made the dialling error before it can transmit its fax based error message.

This means that the cycle for disposing of misdialled fax calls by these devices is much longer than the cycle for disposing of misdialled voice calls. This is because a voice-based responder can rely on the duplex capability of standard voice circuits.

A key characteristic of these simple fax messaging devices is that they are associated with a single exchange line, which was previously used for a fax machine. They can only send a fax in response to a caller attempting to send fax to that particular exchange line number.

Accordingly such simple devices would not be able to respond to widespread misdialling as a result of changed network dialling code regimes.

A fax based responder of the above mentioned type is disclosed in Dutch patent application No. 9400275. In this disclosure an automatic fax answering machine is installed in a telephone exchange for a respective tax subscriber line. The fax answering machine is connected to the old subscriber number and is set up to automatically send an appropriate fax message to a calling subscriber. A failed communications attempt to the old number is dealt with immediately by the answering machine in one of two ways. In one way, the answering machine interrupts the fax connection protocol before the fax is sent and converts the incoming call into a call from the exchange to the calling subscriber number and sends the fax message immediately. In another way the answering machine dis connects the incoming fax call and sets up a new call from the exchange to the calling subscriber number.

BRIEF SUMMARY OF INVENTION

According to a first aspect of the present invention there is provided apparatus for transmitting information, by means of a communication network, to any one of a plurality of communications terminals connected to said network, which said transmission is in response to a failed communications attempt by any one of said terminals, which apparatus comprises:

i) identification means for identifying a network address of a terminal making a failed communications attempt;

ii) at least one storage means configured to store a plurality of network addresses so identified; and iii) information transmission means for transmitting information to a terminal making a failed communications attempt;

wherein said information transmission means is adapted to access said storage means, to locate a network address stored therein and to transmit said information to a network address so located.

According to a second aspect of the present invention there is provided a method of operating a communications network interconnecting a plurality of communications terminals, said method comprising the steps of:

1) detecting a failed communication attempt by a communications terminal;

2) identifying said communication terminal's network address;

3) storing information in a data store configured to store a plurality of network addresses, which information is at least in part dependent on the network address of said communications terminal;

4) retrieving said information from said data store; and 5) using at least part of the information so retrieved to transmit a communications signal to said terminal.

"Failed communications attempt" means in this context a communications attempt which has not succeeded in being connected, at least at first instance. For instance, a misdialled telephone or facsimile number will become a failed communications attempt if the number does not actually represent a network address, for instance because of a code change. (Some misdialled numbers will of course make a connection if the number is still a viable network address, for instance when a user simply uses the wrong number.)

The identification means may identify a network address of a terminal making a failed communications attempt, for instance by selecting a field in incoming data concerning the failed communications attempt, which field contains said network address.

Embodiments of the present invention effectively decouple the process of detecting a misdial from the process of transmitting an error message to the terminal making the misdial. In this way, it becomes possible, for instance, for detection of dialling errors and the provision of a response to happen at substantially the same rates, even when the transmission technology concerned is unidirectional, such as fax terminals, and the transmission of error messages therefore takes considerably longer than identifying the network address of a terminal making a failed communications attempt. This is the case as long as the apparatus is provided with a capacity for sending a greater number of error messages at any one time than the number of network addresses it is identifying at any one time. The apparatus can then read out several network addresses from the storage means and start transmitting error messages to them concurrently, rather than having to deal with each failed communications attempt immediately after receipt.

Transmitting information concurrently with identifying dialling errors enables the apparatus to cycle through calls from terminals using uni-directional protocols, such as the fax protocol, at a similar rate to the rate at which it cycles through misdialled voice calls which use a duplex protocol.

An unexpected and powerful advantage of storing the network addresses arises in that the data inherent therein can be analysed and used in embodiments of the invention for instance to select messages to be sent to future misdialling users.

Advantageously, embodiments of the present invention may further comprise means for identifying communications protocols used by said terminals when making said failed connection attempts. For instance, said apparatus may be adapted to store identified network addresses in the data store in response to identifying a uni-directional protocol.

In particular, the network addresses may be stored in response to the apparatus identifying a fax protocol. Such a network address may be identified by Calling Line Identification (CLI) information provided by many network providers.

Preferably said apparatus is further adapted such that in use transmission of information by said transmission means in response to a failed communications attempt by a first terminal may be performed concurrently with identifying the network address of a second terminal making a failed communications attempt.

The parallel operation of identifying a failed communications attempt concurrently with transmitting information to a different terminal that has previously made a failed communications attempt provides allows a number of misdialled calls to be handled simultaneously.

Preferably the information transmission means is adapted to transmit concurrently information to each of a plurality of network addresses.

BRIEF DESCRIPTION OF THE DRAWINGS

A communications network comprising a call handling and user information system according to an embodiment of the present invention will now be described by way of example only with reference to the accompanying drawings in which.

EXAMPLE OF CALL HANDLING AND INFORMATION TRANSMISSION WITHIN A COMMUNICATIONS NETWORK

Embodiments of the present invention operate to advise customers of a communications network, such as a Public Switched Telecommunications Network (PSTN), that a dialling error has occurred in the call that the customer is attempting to establish.

These embodiments also allow fax terminals to receive, by return fax transmission, dialling error messages. These embodiments are adapted to handle a plurality of such misdialled fax calls on a concurrent basis. In one embodiment, this is achieved by sending these return fax transmissions, independently of detecting the dialling error and independently of detecting that it originated from a fax terminal.

Figure 1:
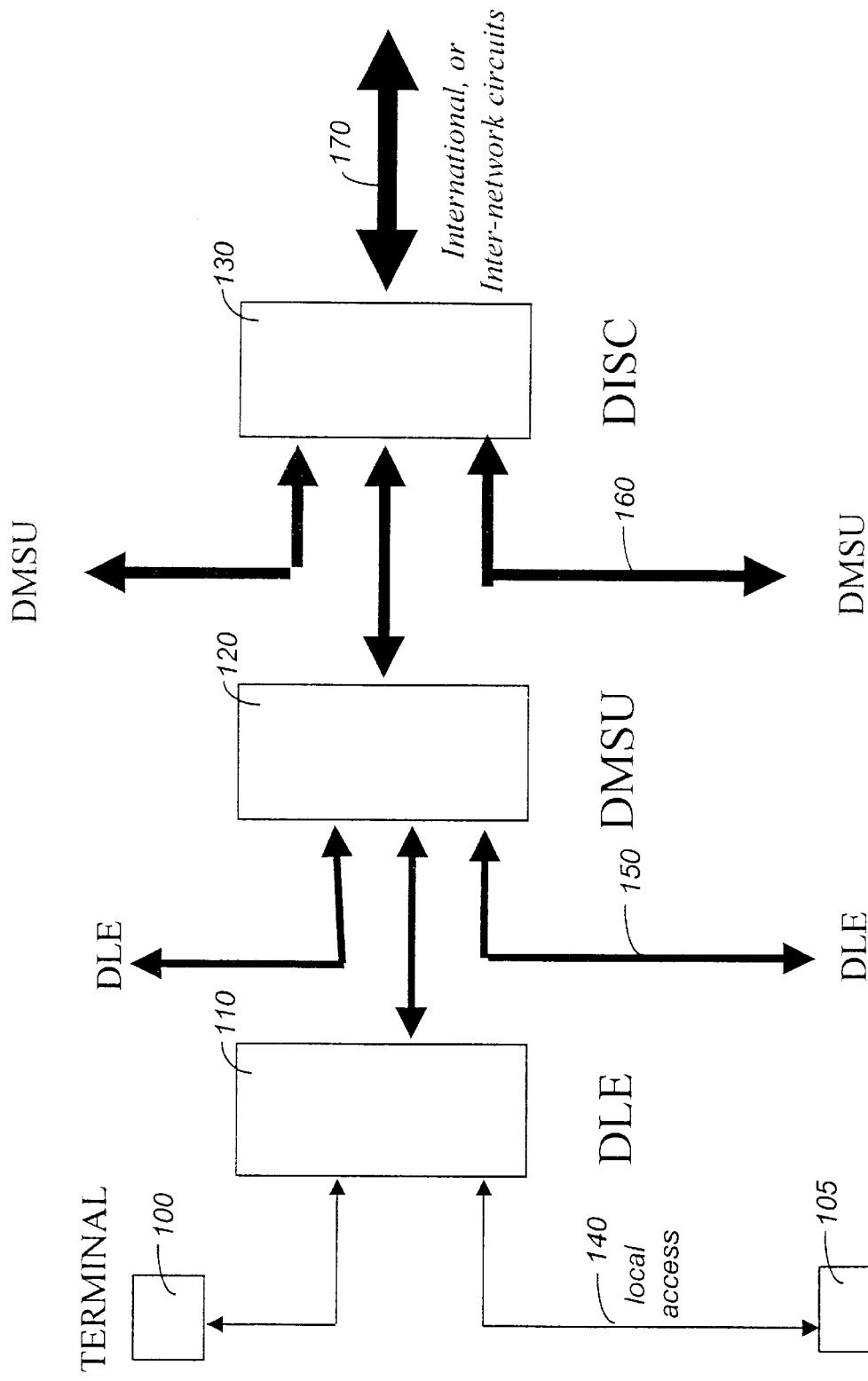
FIG. 1 is a representation of a Communications Network of a type comprising call handling and user information facilities.

FIG. 1 is a representation of a PSTN having a connection between a customer terminal 100 and an inter-network exchange 130 such as a Digital International Switching Centre (DISC).

The terminal 100 is connected to a local access network 140 via a local exchange 110. The local exchange 110, which may be a digital local exchange (DLE) interconnects the local access network 140 with a regional network 150. A Regional exchange 120, which may be a digital main switching unit (DMSU) interconnects the regional network 150 with a national network 160. The DISC 130 interconnects the national network 160 with an international network 170.

Figure 2:
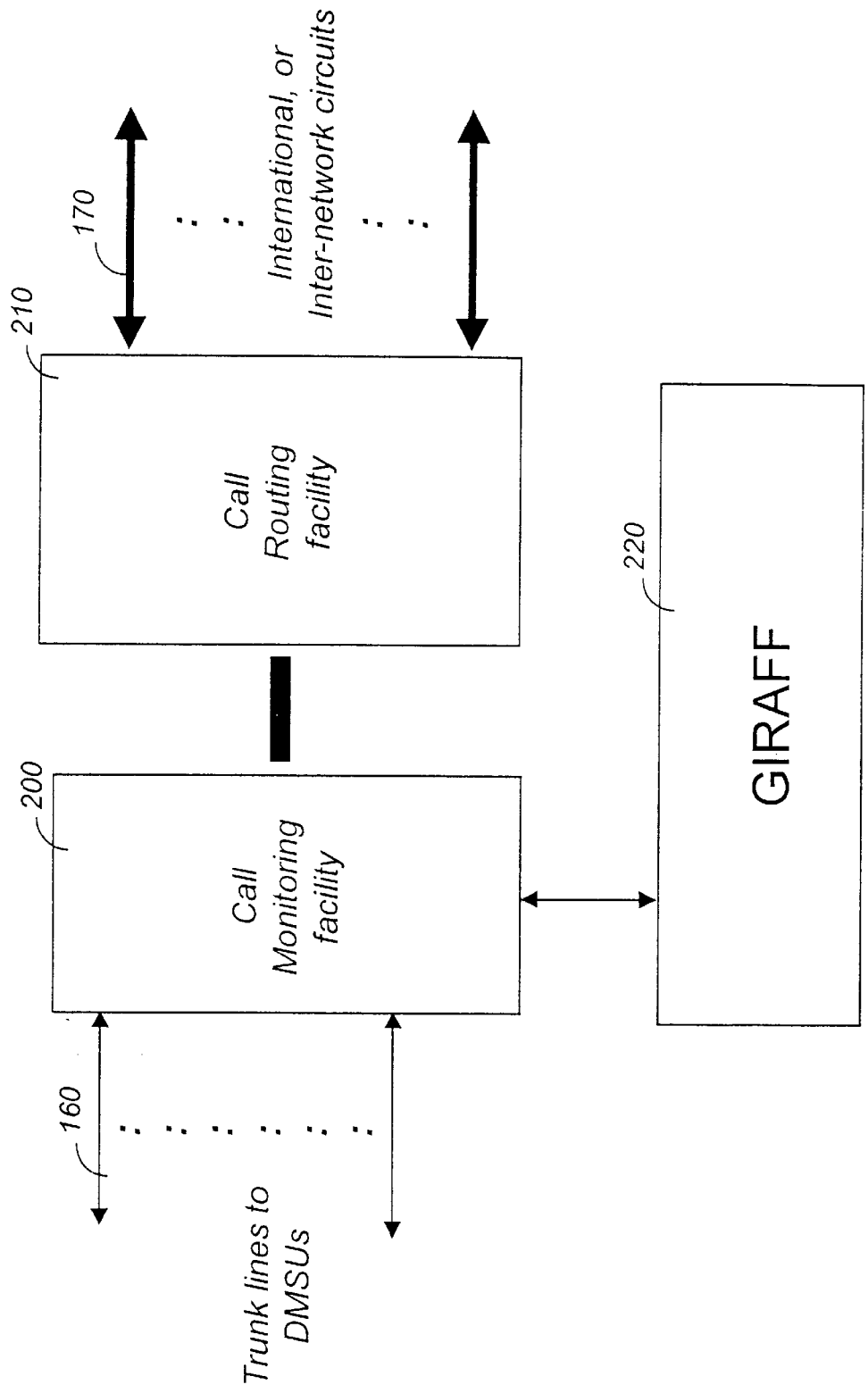
FIG. 2 is a representation of an international switching centre that may reside within the Communications Network of FIG. 1.

FIG. 2 is a representation of the DISC 130, which receives international traffic. Call monitoring apparatus 200, residing within the DISC 130, monitors the destination of each call to determine whether a valid destination has been specified or whether a dialling error has occurred.

Those calls with a valid destination are switched to an appropriate international route. Those calls with a dialling error are switched to a general information and recorded announcement and fax messaging facility (GIRAFF) 220 which in the preferred embodiments combines a fax messaging facility and normal recorded announcement voice messaging facility and which operates to inform customers that a dialling error has occurred.

Figure 3:
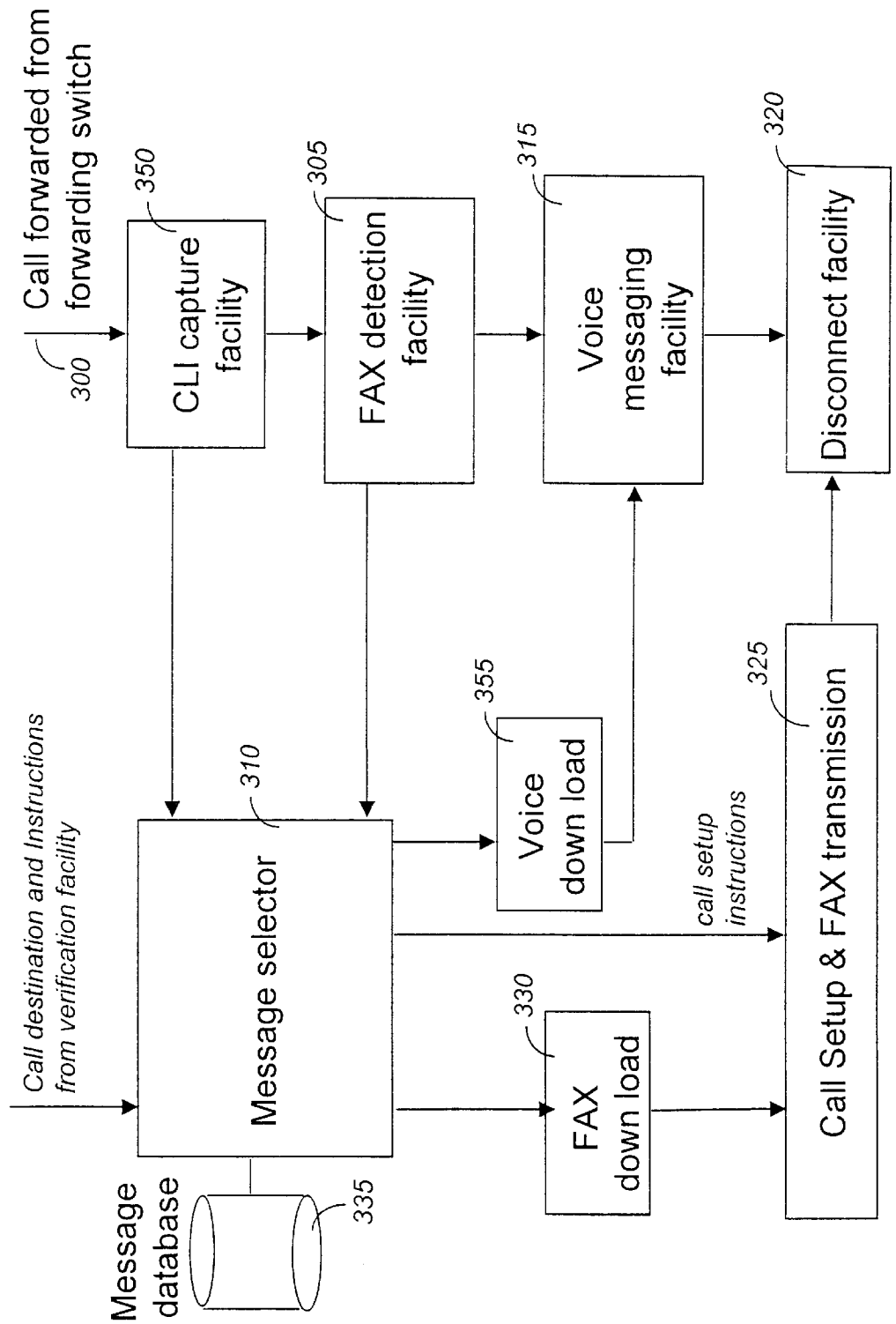
FIG. 3 is a representation of a user information system that may be associated with the call handling facilities of FIG. 3.

FIG. 3 is a schematic representation of the GIRAFF 220. An incoming call 300 is received from the DISC 130 by GIRAFF 220 which seizes the line of the incoming call so as to establish a connection with the customer terminal 100. After the connection is established, the CLI capture facility 350 operates to identify the CLI of the incoming call 300. The CLI is then passed on to a message selector 310. (The CLI of a call is information that accompanies an incoming call. It is network-generated and identifies the network address of the terminal initiating a telephone call.) The CLI capture facility 350 may also identify the number dialled by the terminal 100 and pass this number on to the message selector 310 along with the CLI of the terminal 100.

After the CLI capture facility 350, the call 300 is then monitored by a fax detection facility 305 which operates to detect whether the call 300 is a voice call, a fax call or a data call. The fax detection facility 305 then advises the message selector 310 whether or not the incoming call 300 is a fax call or a voice call. This detection may be performed in accordance with a known manner, for example, in accordance with the manner used on integrated fax and voice terminals.

Subsequent to detecting that the incoming call 300 is a fax call, the connection to the terminal 100 of the user initiating the call is disconnected by a disconnect facility 320. This is because the fax protocol is essentially a uni-directional protocol; ie it will not allow the GIRAFF 220 to Instantaneously transmit a fax message to the terminal 100 in response to its fax misdial. It requires a separate connection to be established from the GIRAFF 220 to the terminal 100 before the GIRAFF 220 can transmit an error message.

After disconnecting the incoming call which had been established as a result of the user's dialling error, the message selector 310 will instruct the call set-up facility 325 to open a new connection to the terminal 100. This new connection to the terminal 100 will be established after a sufficient period has elapsed for the terminal 100 to clear down after the previous connection was disconnected by the disconnect facility 320.

In parallel with establishing a new connection to the user's terminal 100, the message selector 310 selects a fax message from a message database 335 and downloads it to a fax transmission facility 330. The fax transmission facility 330 then transmits this fax message to the terminal 100 using the new connection set up by the call set-up facility 325. Once the message has been transmitted, the connection to the terminal 100 is disconnected by the disconnect facility 320.

The fax transmission facility 325 is not triggered directly by the fax detection facility 305 and the CLI capture facility 300. The CLIs associated with dialling errors are stored in the message selector 310 and then accessed and provided to the fax transmission facility 325 at a later time. This later time can be determined by one or two factors, such as the time taken to clear down the originating call from the user, and/or the time at which the fax transmission facility 325 has available capacity. This enables the GIRAFF 220 to cycle through reception of misdialled fax calls at a similar rate to the rate at which it cycles through misdialled voice calls as there is no equipment tied to an incoming call, waiting for it to clear down. Instead, the CLI (and other data) is simply stored, then sent to the fax transmission facility 325 after a suitable delay.

This facility of storing data in respect of a misdialled call and then sending faxes later, in respect of the stored data, decouples the amount of equipment needed for outgoing faxes from the number of incoming misdialled calls. Multiple outgoing faxes can be sent concurrently from the GIRAFF 220. In this case, the GIRAFF 220 will have a number of lines available to it on which it can establish connections to the terminals 100 from where misdials have originated.

The number of outgoing fax lines can be greater than the average number of incoming fax calls. Sending out a fax takes longer than identifying and storing a CLI. By having a larger number of outgoing lines, it can be ensured that stored data for misdialled fax calls does not build up and that all misdialled fax calls can usually be dealt with.

The number of outgoing fax lines can be tailored to particular circumstances. It may be possible to reduce the number of outgoing fax lines, even below the rate of average fax misdials. This is because some fax machines will have suppressed their CLI and also because not every fax misdial need be responded to.

This last point arises because typically a fax terminal will make several attempts to connect to an incorrect number before reporting that transmission failed. When this occurs, it is preferable not to send an error message in response to every misdial, but to send only one error message per misdialled number every four hours or every twenty four hours. This is discussed further below.

In alternate embodiments, the fax detection facility 305 may be replaced by a protocol identification facility, which operates to distinguish between voice, fax and various other types of data calls and protocols.

Where a protocol identification facility is used, this independent transmission of information will preferably be used to respond to simplex, asynchronous and other non duplex call types, that primarily allow information to be transmitted in one direction only.

In alternate embodiments, the message selector 310 may receive data from the call monitoring apparatus 200 as to the dialling error that has occurred. This data may, for example, specify that the international access code is incorrect, or that the country code is incorrect or that an area code in the country called is incorrect. Other data relating to network congestion, network faults, or insufficient digits in the dialled number may also be provided for.

This data may be transmitted over a common channel signalling arrangement between the DISC 130 and the GIRAFF 220. Alternatively the data may be signalled to the GIRAFF 220 using a direct dial in (DDI) telephony signalling format, carried by voice channels such as provided by ISDN signalling protocols.

The data provided by the call monitoring facility 200 may either specify an exact error message for the dialling error that occurred or only the type of message, e.g. incorrect area code for the country of destination, that is to be played.

DDI signalling may be used to switch the misdialled call to an appropriate extension in a manner common to ISDN equipment. For example, the DDI digit may signal a Hong Kong misdial to the GIRAFF 220 which may use the DDI digits to either switch the misdialled call to an extension dedicated to Hong Kong misdials or the GIRAFF 220 may transfer the DDI digits to the message selector 310 which uses the digits as instructions for retrieving the appropriate messages from the message data base 335.

Where data from the call monitoring facility 200 only identifies the type of message that is to be played, or where no data provided by the call monitoring facility 200, the message selector 310 is required to further analyse the misdialled number of the call 300 in order to determine the exact message that is to be sent to the customer.

This analysis may be performed by comparing the dialled number against a database of valid international, national and regional numbers. Such databases and comparisons for determining dialling errors are well-known in the art and are typically used in international switching centres such as the DISC 130.

Where GIRAFF 220 analyses the dialling error separately to the call monitoring facility in the DISC 130, a greater number of messages can be used by the GIRAFF 220 without increasing the processing that is performed within the DISC 130 by the call monitoring facility 200.

That is, embodiments can operate to combine the data from the call monitoring facility 200 with the number called by the terminal 100 and with the CLI information, in order to select the message that is to be transmitted by the GIRAFF 220.

A further set of information may be stored by the GIRAFF 220 in relation to misdialled calls. For example, as well as the CLI of the terminal originating the misdialled call and the number dialled, the duration of time before the user disconnects the line, and whether the call is a voice, fax or data call, may also be stored.

Such data may be analysed by an analysis tool that uses standard data base and statistical techniques, to identify groups of users who are prone to making particular dialling errors. These may for instance be individual users or users from a particular region or users from a private network. Specific messages can be targeted to users within these groups by checking misdialled numbers against the CLI originating the call and selecting the error message appropriate for that particular CLI. This information may also be used to help identify cases where additional guidance on code changes may be necessary in information sources such as telephone directories and even to indicate possible ways these changes could be managed and/or communicated differently.

An alternative procedure may be provided that automatically generates a message in response to identifying a group of users who are prone to making particular dialling errors.

The analysis tool having identified a specific group may provide information on the area code where these errors are originating or some other combination of parameters that identifies the type of dialling error.

The analysis tool may then access a database of partial messages, which may comprise partial information of an overall message. The system operating so that the analysis tool, in response to identifying the parameters of a particular dialling error, selects a series of partial messages and uses these to compose a full message.

In some circumstances, manual intervention may be required to address a dialling error with a complex cause.

The GIRAFF 220 may also be used to respond to misdialled voice calls. In this instance, the fax detection facility will communicate to the message selector 310 that the call is a voice call. The message selector 310 will then retrieve a voice message from the message storage facility 335 associated with the identified dialling error. This message is then downloaded by a voice download facility 355 to a voice messaging facility 315. The voice messaging facility 315 may be a text to voice conversion system that converts message data into an audible message and causes this to be transmitted over the connection of the incoming call 300 so that it is received by the terminal 100.

Once the audible message has been played, the connection of the incoming call 300 is disconnected by the disconnect facility 320. Preferably, a voice message is transmitted by the GIRAFF 220 in response to both fax and voice calls. This ensures that fax callers, in addition to receiving a fax messaging advising them they have misdialled, are also given the opportunity to hear the voice message and ensures consistency of treatment if some routes and exchanges are not equipped with GIRAFF.

The GIRAFF 220 may be located remotely from the DISC 130 and where C7 signalling is used in the network containing the GIRAFF, the C7 call back protocol may be used to transfer the incoming call 300 from the DISC 130 to the GIRAFF 220. The fax transmission equipment 330 may be co-located with the GIRAFF equipment or maybe remote from both the GIRAFF 220 and the DISC 130. The C7 Protocol above is one means of achieving this.

In one embodiment, standard personal computer-based fax modem cards may be used to generate fax-based error messages. A personal computer containing these cards may have a database of fax-based error messages and receive signalling from GIRAFF 220 as to the fax-based messages to send and their network destinations.

As well, the CLI may be used to ensure that users are not flooded with fax-based error messages. Typical fax machines will attempt to dial a number several times before reporting that transmission failed. Under these circumstances, it is preferable to send only one fax-based message in response to this series of attempted transmissions. CLI records may be checked such that each incoming misdial is only stored if there has not been a similar misdial from that CLI stored in a preselected time interval, such as thirty minutes. Alternatively, CLI records may be used to ensure that a terminal associated with a particular CLI receives only one of any particular error message within any period such as a 4-hour period or a 24-hour period.

A journal of misdialled fax numbers may be sent to a user on a weekly or monthly basis as a service to encourage users to update numbers pre-programmed into their terminals.

As a further alternative, where the CLI of a voice terminal is known to have the same subscriber as a particular fax terminal with the same or a different CLI, specific error message information may be sent to the fax terminal in addition to the audible message sent to the user of the voice terminal when a misdial from the user's voice terminal occurs. This means that the GIRAFF system 220 needs access to user data, such as customer profiles, where CLIs related to the same user are stored. This could be obtained for instance by means of a registration process for the user for a fax misdial service offered on a GIRAFF system.

The above apparatus may be operated according to the method now described with reference to FIGS. 4a and b.

Figure 4A:
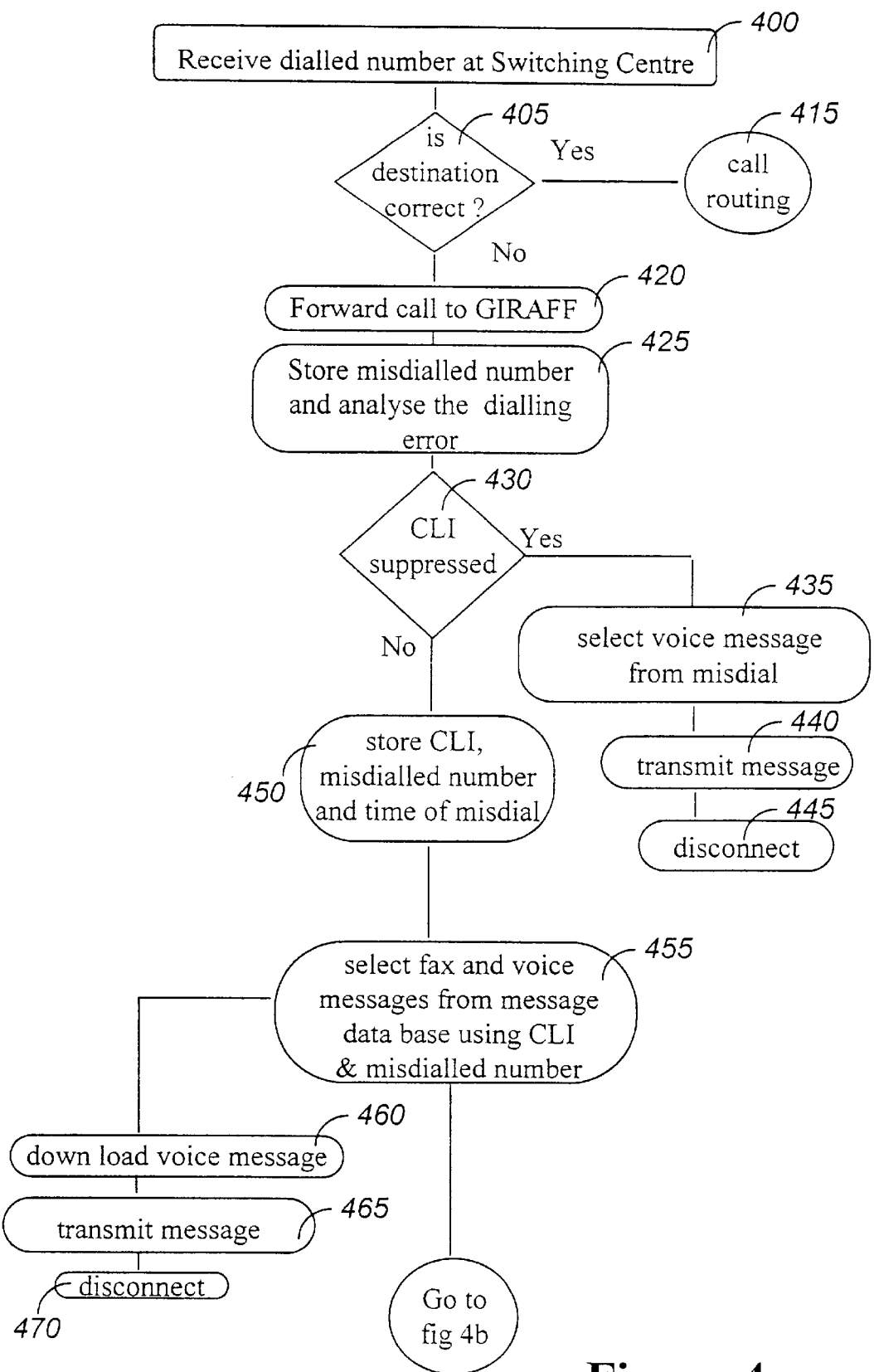
FIGS. 4a and 4b are a flow chart representing one method of operating a preferred embodiment of the present invention.

The method represented by FIG. 4a commences at step 400 by receiving a dialled number at a switching centre which may be the DISC 130 above. The DISC 130 at step 405 analyses whether or not the destination specified for the call is correct. This is typically performed by comparing the dialled number against a database of international codes. If the destination specified is a correct number then at step 415 the call is forwarded to call routing apparatus within the DISC 130. If the destination is not correct then at step 420 the call is forwarded to the GIRAFF 220.

Once the call is received by the GIRAFF 220, the misdialled number at step 425 is first stored then forwarded to a unit for further analysis as to the specific dialling error that has occurred. Although not essential to the invention (as the switching centre has already checked the dialled number for errors), this additional analysis enables the GIRAFF 220 to select a message more specifically targeted at the dialling error that has occurred. In particular it allows GIRAFF, where possible, to transmit a suggested number for the operator of terminal 100 to try.

Additional to the analysis at step 425, the GIRAFF 220 at step 430 determines whether or not the CLI of the incoming call has been suppressed.

If it has been suppressed then at step 435 a general voice message according to the dialling error that has occurred is downloaded from a message database. This message at step 440 is then transmitted over the duplex voice circuit to the terminal that has established the incoming call. After the voice message has been played a pre-determined number of times, for example one, two, or three times the connection to the terminal 100 at step 445 is disconnected.

If at step 430 the CLI has not been suppressed then at step 450 the CLI is entered into a store along with the misdialled number and the time of the misdial. The CLI at step 455 is then combined with the results of the analysis of the dialling error at step 425 SO as to select a message that is appropriate for the CLI of the terminal 100 that has made the dialling error. For example, users in particular areas may be prone to making particular dialling errors, in this case the CLI information enables the GIRAFF 220 to determine whether or not the dialling error has originated from one of these areas, and if it has, to select a message appropriate for that area. Alternatively, the dialling error may have originated from a private circuit or a specific customer. In which case a specific message for customers of that private circuit or for the customer of the particular CLI may be appropriate.

After this analysis, both a fax and a voice message are preferably identified within the message database as being the messages that should be transmitted by the GIRAFF 220.

Once the voice and fax messages have been identified, the voice message at step 460 is preferably downloaded to a transmission facility, which then at step 465 transmits the voice message to the terminal 100. This message may be transmitted 1, 2, 3 or a preferred number of times before the connection to the terminal 100 is disconnected.

At step 475, in parallel with downloading the voice message from the message database, the GIRAFF 220 listens to the connection with the terminal 100 for fax calling tones. Where these fax calling tones are absent, then it is deemed that the call is not a fax call and at step 480 no further action is taken by the GIRAFF when the voice circuit is disconnected.

However, where the fax calling tones are detected, then at step 485 the 10 GIRAFF 220 proceeds to download a fax message to a fax transmission facility. The GIRAFF 220 at step 490 also downloads the CLI of the terminal 100 to the fax transmission facility.

The GIRAFF 220 at step 4950 then waits for disconnection of the voice circuit following transmission of the voice message by the voice transmission facility at step 470. The GIRAFF 220 then waits for the terminal 100 to clear down at step 4955.

Once sufficient time at step 4955 has been allowed for the terminal 100 to clear down, the GIRAFF 220 then attempts at step 4960 to establish a connection with the terminal 100.

Once a connection to the terminal 100 has been established the fax based error message at step 4965 is then transmitted before the circuit is disconnected at step 4970.

Figure 4B:
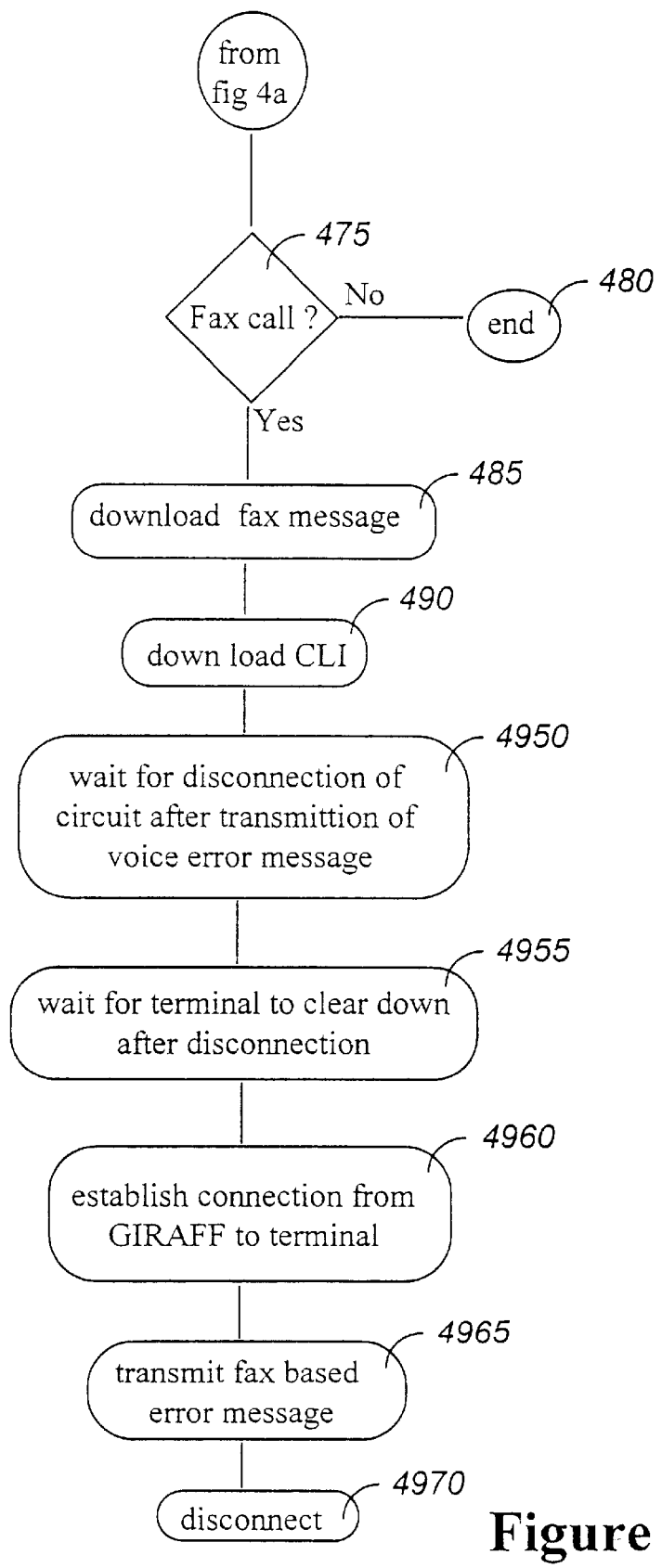
Figure 5:
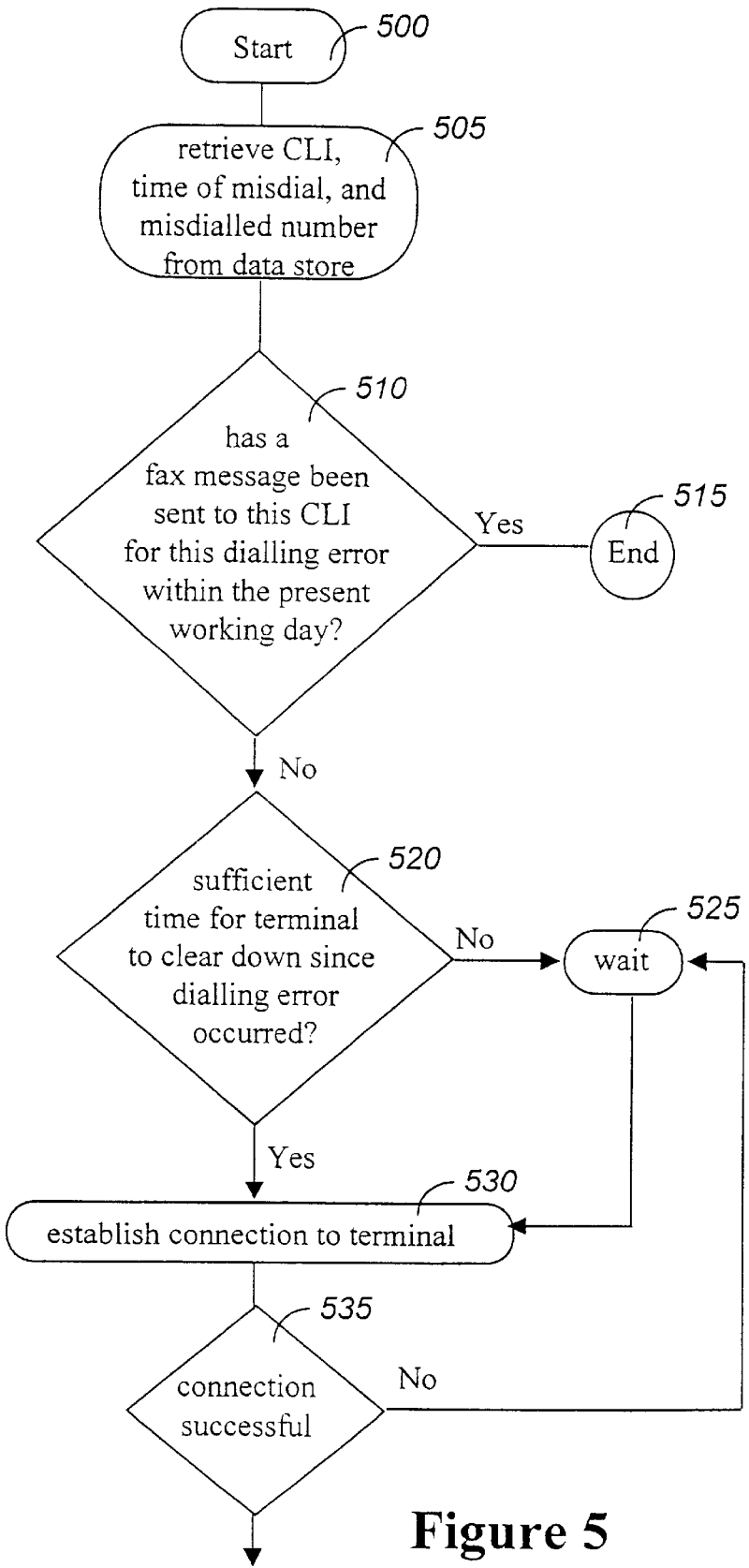
FIG. 5 is a flow chart representing one aspect of the method in FIGS. 4a and 4b in greater detail.

FIG. 5 is a representation in greater detail of the steps described in FIG. 4b relating to transmission of a fax based error message to the terminal 100. In this regard, it is preferable that once the GIRAFF 220 has determined that a fax based error message should be transmitted to the terminal 100, that the GIRAFF 220 checks to determine whether or not an equivalent message has been transmitted to the terminal 100 within the past four hours, or within the present working day, or some other pre-determined time period.

To achieve this, the GIRAFF 220 will preferably at step 500 retrieve the misdialled number, the time of the misdial and the CLI of the terminal originating the misdial from the data store.

The GIRAFF 220 at step 510 will then compare the CLI, the time that the misdial occurred and the misdialled number against a database of messages containing information as to the fax based error messages that the GIRAFF 220 has transmitted, the time and date that these messages were transmitted and the network address to which these messages were transmitted.

If GIRAFF 220 is repeating an error message to a terminal that received an identical error message for an identical or similar dialling error within the previous pre-determined period, then at step 515 it is preferable that this error message be suppressed. Such messages are preferably suppressed because a typical fax machine will make several attempts to establish a connection before reporting to the operator of the terminal 100 that a failed transmission has occurred.

Suppressing repeat transmissions of error messages allows the GIRAFF to respond only once to any particular dialling error, and to increase the capacity of the GIRAFF 220 as it is not re-transmitting information previously sent. This will also eliminate annoyance to the operator of terminal 100 due to receiving repeat transmissions of the same error message.

An alternative process is to wait a pre-determined period for the terminal 100 to cease these attempts at transmitting a misdialled number and to then transmit one error message referring to these various attempts.

Where at step 520 a fax has not been sent within the previous predetermined period the GIRAFF 220 then analyses the time at which the dialling error was made to determine whether sufficient time has elapsed since that dialling error for the terminal 100 to have cleared down.

Where at step 525 a sufficient amount of time has not elapsed then the error message that GIRAFF is attempting to send is placed on hold until such time as the terminal 100 has cleared down.

Where at step 530 sufficient time has elapsed then the GIRAFF 220 attempts to establish a connection with the terminal 100. When at step 535 this connection is successful then the GIRAFF 220 proceeds to transmit the fax based error message as described in the above FIG. 4b above. Where at step 535 the connection attempt is not successful then the GIRAFF 220 preferably waits a predetermined period before attempting a second connection. The GIRAFF 220 may attempt to make a number of connections before abandoning its attempts to transmit fax based error messages.

Figure 6:
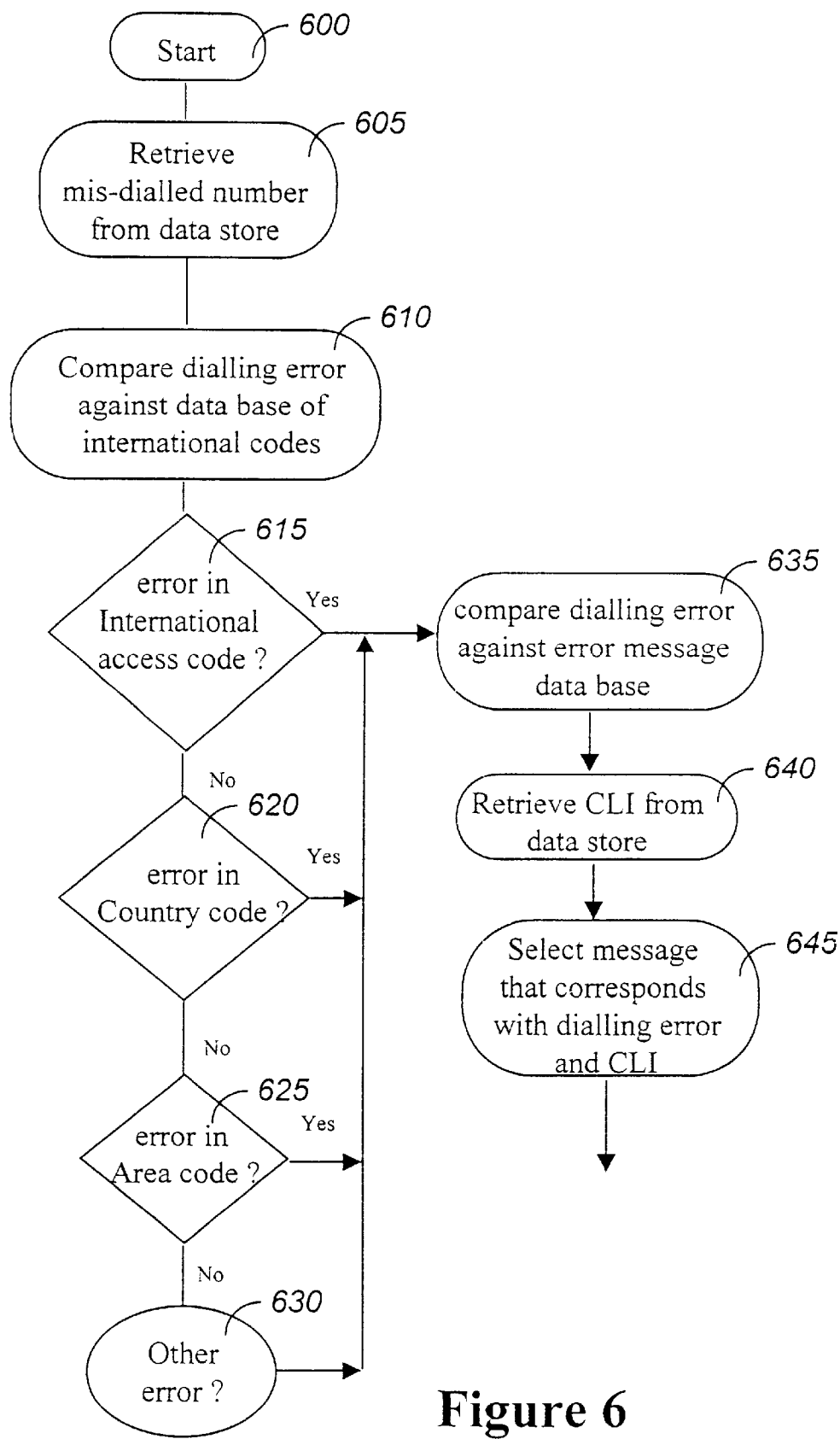
FIG. 6 is a flow chart representing one aspect of the method in FIGS. 4a and 4b in greater detail.

FIG. 6 is a flow chart representing in greater detail of steps 425, 435, 460 and 485 in FIGS. 4a and 4b of analysing a misdialled number and selecting an appropriate error message.

This comparison preferably proceeds at step 605 by retrieving the misdialled number from the data store. This is followed at step 610 by initiating a comparison of the misdial against a database of international codes. This comparison at step 615 proceeds first of all by checking that the dialled international access code is valid. If this is the case, then at step 620 by checking the country code dialled against a list of valid country codes. If the country code is correct then at step 625 by comparing the area code dialled against a list of valid area codes for the country code dialled. Where changes have occurred to the area codes of the specified country, this analysis preferably checks to determine whether the dialling error has simply been to omit these changes from the number dialled. Where this is the case, the GIRAFF 220 preferably determines what the correct number should be based on the number dialled and the changes that should have been expected. This information is preferably included in the error message.

It may be the case that some other form of error has occurred, for some countries this may be an error in the regional code or it may be that there are insufficient digits in the number dialled for the country of destination.

Once the nature of the dialling has been determined, GIRAFF 220 at step 635 then compares the dialling error identified against a database of error messages. GIRAFF 220 can then identify a number of messages within the database that can possibly be transmitted to the terminal 100.

GIRAFF 220 at step 640 then retrieves the CLI from the datastore, where it has been stored after the detection, as discussed in FIG. 4a, and the CLI at step 645 is used to select the appropriate message from the selection of messages identified, based on the comparison of the dialling error with the message error database and the CLI retrieved.

This process will select both a fax and a voice message from the database. In some embodiments a marker for these messages will be stored in the datastore containing the CLI, the time of the misdial and the misdialled number.

As discussed in FIGS. 4a and 4b, once the voice and fax messages have been selected the GIRAFF 220 is then ready to download them to the voice transmit facility, and where a fax message is required the marker identifying the fax message can be retrieved from the datastore so that the fax transmission facility can download the appropriate fax message from the message database when it is required.

Figure 7:
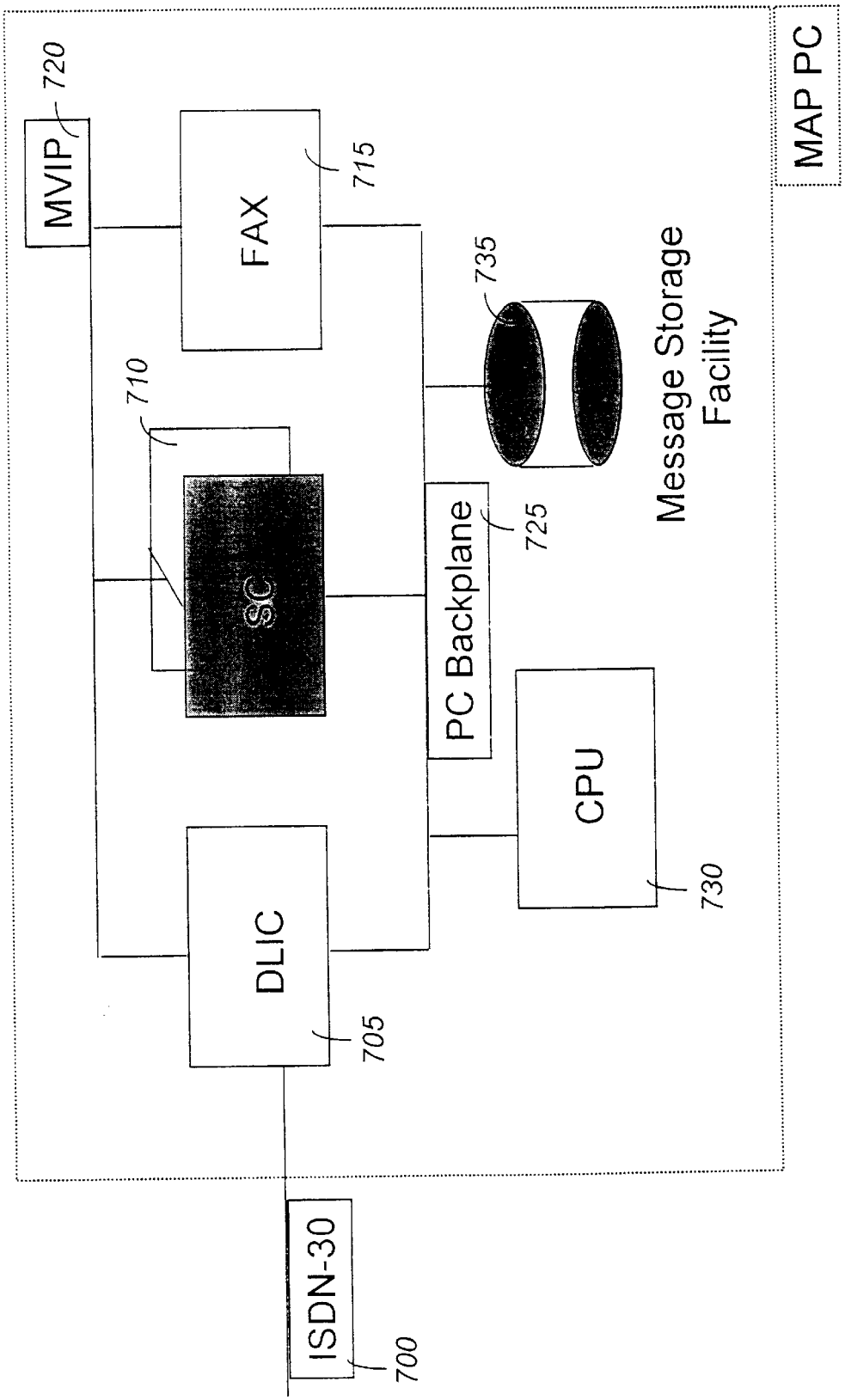
FIG. 7 is an alternate form of the user information facility of FIG. 3.

FIG. 7 details an embodiment of the GIRAFF system 220 which uses a "Minor Applications Platform" (MAP) to host the service. The MAP is detailed in the Applicants' co-pending International Patent application No. GB 97/02608. One or more MAP systems may be used to provide the service, one MAP system acting as backup or as additional capacity. Incoming calls can be distributed among the MAP systems to ensure as far as possible that each system is equally used.

The GIRAFF system is a set of applications which run on the MAP processing unit 730 (which can be provided by a personal computer). ISDN direct dial in (DDI) digits are provided with each incoming call from the DISC 130. These identify the route misdial and are used by the MAP 200 to select the GIRAFF application.

The MAP system, for the purposes of GIRAFF, comprises a personal computer (PC) based around a CPU 730 equipped with one Digital Line card 705 for example an ISDN card, two speechcards 710, one fax card 715 and one network card. The MAP system can provide all the capabilities, such as text to speech conversion, to support a GIRAFF system 220. It is available from Aculab under the trade mark MILLENIUM—CT.

The MAP platform is controlled by a MAP manager; software which also runs on the PC. Calls terminate on the digital line card 705 which signals call arrival to the MAP manager along with a DDI digit. The MAP manager uses the digit to select the appropriate form of the GIRAFF application—this might be a misdialled international access code, or a failed attempt to ring Hong Kong.

All forms of the GIRAFF application start with the same action—replaying of a selected voice announcement with a parallel activity to detect a fax calling tone, and collection of any CLI information. The presence of a fax calling tone is indicative of a calling fax; if the tone is not detected the call will be a voice call or a data call.

On voice calls, the application will keep open the line the call came in on and send one or more standard voice messages concerning the misdial. It will send the messages until either the application terminates or the caller replaces his handset.

On a fax call, the application may either terminate the call on fax tone detection or following replay of an audible announcement. However, if CLI was available for a fax call, a message incorporating the CLI is put on a queue for fax transmissions to be sent, provided that a similar fax transmission has not been sent to this CLI within a preceding predetermined period. Messages are taken off the queue by a separate GIRAFF application which deals with them appropriately.

The application which takes messages off the queue provides the function of the GIRAFF message selector 310. It needs to be able to identify what fax transmission should be sent to the CLI in response to the incoming misdial. The message which was queued may either contain all the relevant data, or it may contain an address for the relevant data in the MAP database 335.

The data the message selector 310 needs, in order to decide what fax transmission should be sent, is discussed above. It might simply be a message identifier, provided by the call monitoring apparatus 200. However, if the GIRAFF system 220 selects a fax transmission, it may need other data from the call monitoring apparatus 200, such as which part of a dialled number was incorrect (the international, country or area code) and whether there is a network problem relevant to that number.

Lastly, there may be data generated by the GIRAFF system 220 itself which the message selector 310 will need, such as that of a general pattern of misdialling is associated with the CLI for which a targeted message is appropriate.

According to the embodiment of FIG. 7, all speech announcements are coded at 8 kbit/s. These messages are held in the message database storage facility 335 (or in cache); on demand the speech from the store is decoded using DSPs on the speech cards before being passed via the DLIC to the caller. The speech cards also provide fax tone detection capability. A separate PC card is used to provide fax transmission capability; its use is controlled by a separate application. A feature of the platform is that by virtue of using application selection by DDI the system dynamically provides service on any application within the overall limit of available line capacity. Thus, for instance, the platform might be largely devoted to handling French misdials during UK daytime, whilst at night it becomes primarily involved in handling Hong Kong misdials.

It will be apparent to a person skilled in the art that the present invention is not limited to application to international dialling errors of PSTNs exchanges of public switched telephone networks. It could equally be applied to national, regional and even local dialling errors. Alternatively, it can be applied to gateways between networks of competing operators or gateways interfacing private networks with national and international networks.

It will also be apparent that the error messages are not limited to voice and fax calls and that broadband calls and other call types may also be responded to. In particular broadband calls and other data calls using asynchronous or simplex type protocols may be responded to by networks and apparatus of the types set out herein or in accordance with methods of the types set out herein.

What is claimed is:

1. Apparatus for transmitting information, by means of a communications network, to any one of a plurality of communications terminals connected to said network, which said transmission is in response to a failed communications attempt by any one of said terminals, the apparatus comprising:

i) identification means for identifying a network address of a terminal making a failed communications attempt;

ii) at least one storage means configured to store a plurality of network addresses so identified; and iii) information transmission means for transmitting information the transmission of information is not part of the failed communications attempt, to a terminal making the failed communications attempt;

wherein said information transmission means is adapted to access said at least one storage means, to locate a respective network address stored therein and to transmit said information to said respective network address so located.

2. Apparatus as claimed in claim 1 wherein said apparatus is further adapted such that in use transmission of information by said transmission means in response to a failed communications attempt by a first terminal may be performed concurrently with identifying the network address of a second terminal making a failed communications attempt.

3. Apparatus as claimed in claim 2 wherein said identification means is adapted to identify concurrently the network address of each of a plurality of terminals making failed communications attempts, and to store the network addresses in said at least one storage means.

4. Apparatus as claimed in claim 1, wherein the information transmission means is adapted to transmit concurrently information to each of a plurality of network addresses.

5. Apparatus as claimed in claim 1 further comprising selection means for selecting information for transmission by said information transmission means.

6. Apparatus according to claim 5 wherein said selection means is adapted such that selection of said information is at least partially dependent on the network address to which said information is to be transmitted.

7. Apparatus as claimed in claim 5 wherein said selection means is adapted such that said selection of information is at least partially dependent on information previously transmitted by said transmission means to said network address, of the terminal making a failed communications attempt said previous information being transmitted within a predetermined time period.

8. Apparatus as claimed in claim 5 further comprising receiving means for receiving signals transmitted by said network in response to a failed communications attempt and wherein said selection of said information by said selection means is at least partially dependent on said signals so received.

9. Apparatus as claimed in claim 8 further adapted to operate according to an ISDN protocol and wherein said network generated signals are Direct Dial In ISDN digits.

10. Apparatus as claimed in claim 5 further comprising means for storing data associated with a failed communications attempt in said at least one storage means and analysing means for analysing said data associated with said failed communications attempt and wherein said selection of information is further dependent on an output of said analysing means.

11. Apparatus as claimed in claim 10 wherein said analysing means is adapted to analyse data associated with a plurality of failed communications attempts, and wherein said selection of information is further dependent on an output of said analysing means in respect of said plurality of failed communications attempts.

12. Apparatus as claimed in claim 11 wherein said data associated with said failed communications attempt(s) comprises one or more network destinations.

13. Apparatus as claimed in claim 12 wherein said data comprises a plurality of network destinations having a common characteristic.

14. Apparatus as claimed in claim 10 further adapted to store the output of said analysing means in said at least one storage means, said output being stored in association with the network address of the terminal making the failed communications attempt and said selection means being adapted to access said output and said network address.

15. Apparatus for transmitting information, by means of a communications network, to any one of a plurality of communications terminals connected to said network, which said transmission is in response to a failed communications attempt by any one of said terminals, the apparatus comprising:
  i) identification means for identifying a network address of a terminal making a failed communications attempt;
  ii) at least one storage means configured to store a plurality of network addresses so identified; and
  iii) information transmission means for transmitting information to a terminal making a failed communications attempt;
  wherein said information transmission means is adapted to access said at least one storage means, to locate a respective network address stored therein and to transmit said information to said network address so located; and
  said apparatus further comprises detection means for detecting one or more communications protocols used by the plurality of communication terminals, and said apparatus is adapted to store the network addresses in said at least one storage means in response to said detection means detecting a unidirectional protocol.

16. Apparatus as claimed in claim 15 wherein said unidirectional protocol is a fax protocol.

17. A method of operating a communications network interconnecting a plurality of communications terminals, said method comprising the steps of:
  1) detecting a failed communications attempt by a communications terminal;
  2) identifying said communications terminal's network address;
  3) storing information in a data store configured to store at least a plurality of network addresses, which information is at least in part dependent on the network address of said communications terminal;
  4) retrieving said information from said data store; and
  5) using at least part of the information so retrieved to transmit a communications signal to said terminal, the communications signal not being part of the failed communications attempt itself.

18. A method as claimed in claim 17 wherein step 5) for a failed communications attempt by at least a first terminal may be performed concurrently with step 2) for a failed communications attempt by at least a second terminal.

19. A method as claimed in claim 17 further comprising the step of:
  selecting said communications signal for transmission to said terminal from a data store, the selection being dependent on the network address to which said signal is to be transmitted.

20. A method as claimed in claim 19 further comprising the steps of:
  storing in at least one data store signal identification data which data identifies a signal transmitted to a network address and which data is stored in association with said network address,
  comparing said signal selected for transmission to said network address against signal identification data associated with said network address, and
  transmitting said selected signal dependent on the results of said comparison.

21. A method as claimed in claim 19 further comprising storing data associated with said failed communications attempt and performing an analysis of a network destination specified by said terminal, which said destination resulted in said failed communications attempt; output data classifying said specified destination into at least one of a plurality of error types and selecting said communications signal for transmission to said terminal from a data store, the selection being dependent on the network address to which said signal is to be transmitted in dependence on said at least one error type.

22. A method as claimed in claim 17 wherein step 1) is performed at a first location in said network and step 5) is performed at a second location in said network and wherein said first location transmits information signals to said second location which said information signals are dependent on step 1) and wherein step 5) is performed by said second location dependent on said information signals received from said first location.

23. A method as claimed in claim 22 wherein said first and second locations operate according to an ISDN protocol and wherein said information signals comprise one or more Direct Dial In ISDN digits.

24. A method as claimed in claim 17 further comprising the steps of:
   storing data associated with said failed communications attempt in a data store;
   analysing said data; and
   selecting said communications signal for transmission to said terminal from a data store, the selection being dependent on the network address to which said signal is to be transmitted in further dependence on analysis of said data.

25. A method of operating a communications network interconnecting a plurality of communications terminals, said method comprising the steps of:
   1) detecting a failed communications attempt by a communications terminal;
   2) identifying said communications terminal's network address;
   3) storing information in a data store configured to store a plurality of network addresses, which information is at least in part dependent on the network address of said communications terminal;
   4) retrieving said information from said data store;
   5) using at least part of the information so retrieved to transmit a communications signal to said terminal;
   6) detecting a communications protocol used by said terminal during said failed communications attempt;
   7) disconnecting a network connection with said terminal making a failed communications attempt in response to detecting a unidirectional protocol; and
   8) establishing a connection to said disconnected terminal for said transmission of said communications signal.

26. A method as claimed in claim 25 wherein said unidirectional protocol is a fax protocol.

27. A method of operating a communications network interconnecting a plurality of communications terminals, said method comprising:

1) detecting a plurality of failed communications attempts made by a communications terminal;
2) identifying a network address of said communications terminal making the plurality of failed communications attempts;
3) storing information in a data store configured to store a plurality of network addresses;
4) retrieving said information from said data store; and
5) using at least part of the information so retrieved to transmit a communications message to said terminal in response to the detection of a plurality of failed communications attempts from that terminal.

28. A method as claimed in claim 27 wherein the message is a faxed based message.

29. Apparatus for transmitting information, by means of a communications network, to any one of a plurality of communications terminals connected to said network, which said transmission is in response to a failed communications attempt by any one of said terminals, the apparatus comprising:
   i) identification means for identifying a network address of a terminal making a failed communications attempt, the communication of the failed communications attempt made by the terminal being a simplex communication;
   ii) at least one storage means configured to store a plurality of network addresses so identified; and
   iii) information processing means for accessing said at least one storage means, locating the network address of the terminal making the failed simplex communications attempt stored therein and transmitting said information to the located network address.

30. A method of operating a communications network interconnecting a plurality of communications terminals, said method comprising:
   1) detecting a failed communications attempt by a communications terminal, the communication of the failed communications attempt being a simplex communication;
   2) identifying the network address of said communications terminal communicating the failed simplex communications attempt;
   3) storing information in a data store configured to store a plurality of network addresses including the network address of the communications terminal communicating the failed communications attempt;
   4) retrieving said information from said data store; and
   5) using at least part of the information so retrieved to transmit a communications signal to said terminal communicating the failed simplex communications attempt.

* * * * *